(12) United States Patent
Phan et al.

(10) Patent No.: US 12,210,403 B2
(45) Date of Patent: Jan. 28, 2025

(54) ASSET REPLACEMENT OPTIMIZATION BASED ON PREDICTED RISK OF FAILURE

(71) Applicant: International Business Machines Corporation, Armonk, NY (US)

(72) Inventors: Dzung Tien Phan, Pleasantville, NY (US); Lan Cao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 18/146,362

(22) Filed: Dec. 24, 2022

(65) Prior Publication Data
US 2024/0231983 A1 Jul. 11, 2024

(51) Int. Cl.
*G06F 11/07* (2006.01)
*G06Q 30/0283* (2023.01)

(52) U.S. Cl.
CPC ...... *G06F 11/0751* (2013.01); *G06F 11/0721* (2013.01); *G06Q 30/0283* (2013.01)

(58) Field of Classification Search
CPC .......... G06F 11/0751; G06F 11/0721
USPC ........................................ 714/47.3
See application file for complete search history.

(56) References Cited

U.S. PATENT DOCUMENTS

| | | | |
|---|---|---|---|
| 6,581,045 B1 | 6/2003 | Watson | |
| 9,959,514 B2 | 5/2018 | Phan | |
| 10,533,978 B2 * | 1/2020 | Benke | G01N 29/46 |
| 11,232,368 B2 | 1/2022 | Tashman | |
| 11,923,792 B2 * | 3/2024 | Dubber | H02P 23/0077 |

| | | | |
|---|---|---|---|
| 2006/0009935 A1* | 1/2006 | Uzarski | G06Q 10/06 |
| | | | 702/81 |
| 2007/0150325 A1* | 6/2007 | Bjornson | G06Q 10/06 |
| | | | 705/7.42 |
| 2008/0077368 A1* | 3/2008 | Nasle | G05B 17/02 |
| | | | 703/4 |

(Continued)

FOREIGN PATENT DOCUMENTS

| | | | | |
|---|---|---|---|---|
| CN | 110046716 A | * | 7/2019 | ....... G06Q 10/06311 |
| CN | 112232569 A | * | 1/2021 | |

OTHER PUBLICATIONS

R. Otal and A. Bakulev, "Risk-based asset management optimization," 2014, IEEE PES T&D Conference and Exposition, Chicago, IL, USA, 2014, pp. 1-5, doi: 10.1109/TDC.2014.6863414. (Year: 2014).*

(Continued)

*Primary Examiner* — Chae M Ko
(74) *Attorney, Agent, or Firm* — Onyx IP Group

(57) ABSTRACT

In some implementations, an optimization system may obtain health information identifying different measures of health of an asset. The health information identifies end of life information regarding an end of life curve of the asset and an effective age of the asset. The optimization system may determine, based on the health information, a hazard curve for the asset. The hazard curve indicates a predicted failure rate of the asset over a period of time. The optimization system may provide the hazard curve and the effective age of the asset as inputs to an optimization model. The optimization system may use the optimization model to determine a particular time for replacing the asset, wherein the particular time is determined based on the hazard curve and the effective age. The optimization system may cause the asset to be replaced at the particular time.

25 Claims, 10 Drawing Sheets

100 ⟶

Asset health configuration system 105

Asset replacement optimization system 110

Optimization model 115

Client device 120

(56) References Cited

U.S. PATENT DOCUMENTS

| | | | |
|---|---|---|---|
| 2011/0054806 A1* | 3/2011 | Goldfine | G07C 3/00 |
| | | | 702/34 |
| 2012/0316906 A1 | 12/2012 | Hampapur | |
| 2014/0330749 A1 | 11/2014 | Candas | |
| 2015/0073862 A1 | 3/2015 | Davenport | |
| 2015/0363750 A1* | 12/2015 | Svensson | G06Q 10/20 |
| | | | 702/34 |
| 2016/0116368 A1* | 4/2016 | Cornelius | G06F 11/00 |
| | | | 702/34 |
| 2019/0385385 A1* | 12/2019 | Davidson | G07C 5/0808 |
| 2020/0380391 A1* | 12/2020 | Allard | G05B 23/0283 |
| 2022/0156664 A1 | 5/2022 | Byk | |
| 2024/0104340 A1* | 3/2024 | Gladden | G06N 3/04 |

OTHER PUBLICATIONS

Chuanzhou Jia et al., Joint Optimization of Maintenance Planning and Workforce Routing for a Geographically Distributed Networked Infrastructure, IISE Transactions, Jul. 22, 2019, pp. 1-44.

* cited by examiner

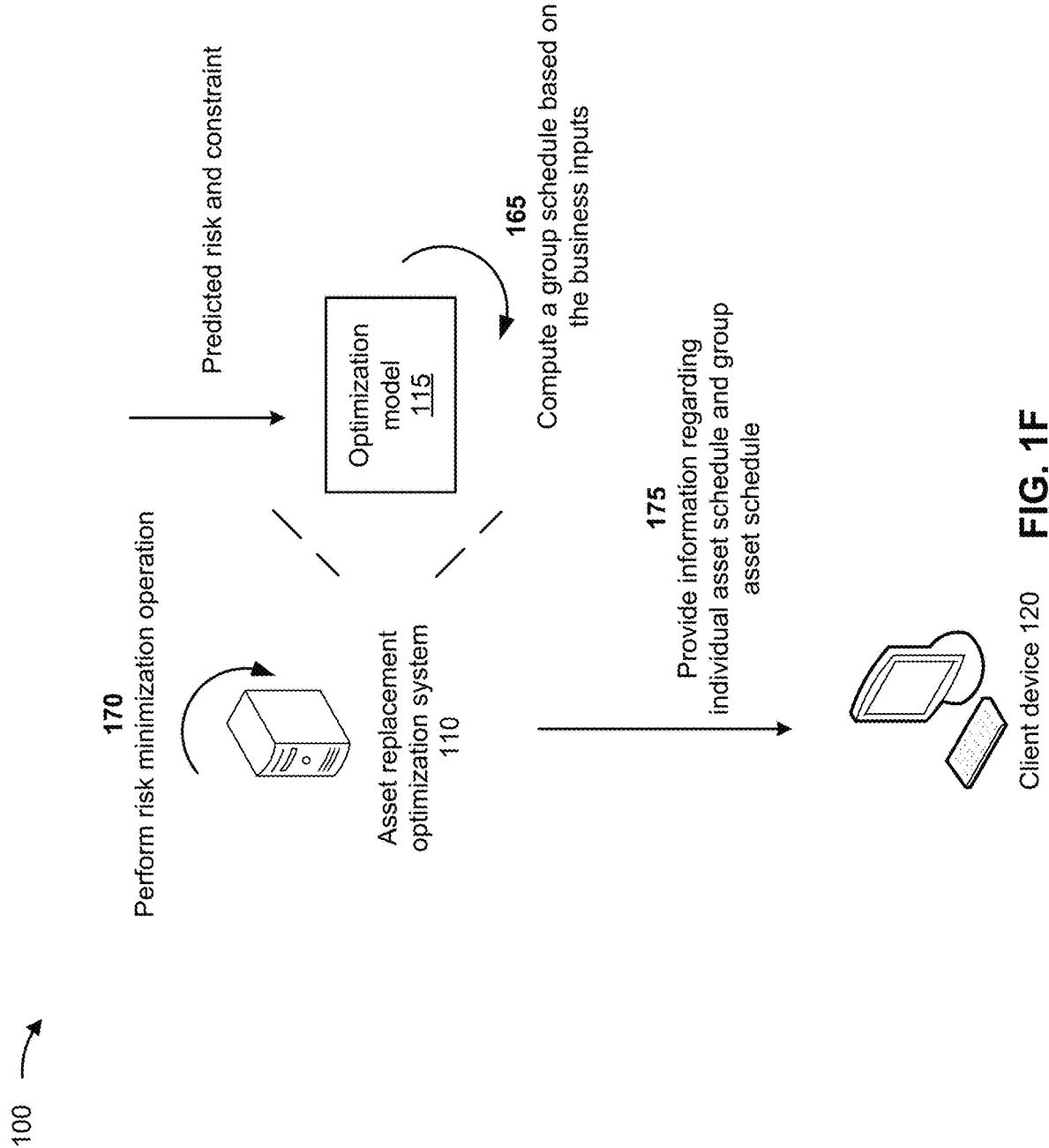

ASSET REPLACEMENT OPTIMIZATION BASED ON PREDICTED RISK OF FAILURE

BACKGROUND

The present invention relates to the field of management of a fleet of assets, and more specifically, to replacement of assets based on predicted risk of failure of the assets. In some examples, the assets may be included in an electric power system (or power system). Over a period of time, an asset of the electric power system may experience wear. Accordingly, over the period of time, the asset may undergo maintenance and/or may be replaced.

SUMMARY

In some implementations, a computer-implemented method comprises: obtaining health information identifying different measures of health of an asset. The health information identifies end of life information regarding an end of life curve of the asset and an effective age of the asset. The computer-implemented method further comprises determining, based on the health information, a hazard curve for the asset. The hazard curve indicates a predicted failure rate of the asset over a period of time. The computer-implemented method comprises providing the hazard curve and the effective age of the asset as inputs to an optimization model; using the optimization model to determine a particular time for replacing the asset; and causing the asset to be replaced at the particular time. The particular time is determined based on the hazard curve and the effective age.

In some implementations, a computer program product comprises: one or more computer readable storage media, and program instructions collectively stored on the one or more computer readable storage media, the program instructions comprising: program instructions to determine, based on health information regarding an asset, a hazard function for the asset and a predicted measure of risk of failure for the asset. The health information identifies end of life information regarding a measure of durability of the asset and an effective age of the asset. The hazard function indicates a predicted failure rate of the asset over a period of time; program instructions to provide the hazard function and the effective age of the asset as inputs to an optimization model. The program instructions comprise program instructions to use the optimization model to determine a particular time for replacing the asset; and program instructions to cause the asset to be replaced at the particular time. The particular time is determined based on the hazard curve and the effective age.

In some implementations, a system comprises: one or more devices configured to: determine, based on health information regarding an asset, a hazard function for the asset and a predicted measure of risk of failure for the asset. The asset is included in a plurality of assets that are geographically distributed. The health information identifies end of life information regarding a measure of durability of the asset and an effective age of the asset. The hazard function indicates a predicted failure rate of the asset over a period of time. The one or more devices are further configured to provide the hazard function and the effective age of the asset as inputs to an optimization model; use the optimization model to determine a particular time for replacing the asset; and cause the asset to be replaced at the particular time. The particular time is determined based on the hazard function and the effective age.

In some implementations, a computer-implemented method performed by an asset replacement optimization system includes obtaining health information identifying different measures of health of a plurality of assets of a system. The plurality of assets are geographically distributed; and determining an appropriate time to replace at least one asset of the plurality of assets of the system. The appropriate time is determined using an optimization model that considers predicted risk scores, end of life curves, and hazard curves. The predicted risk scores, the end of life curves, and the hazard curves are determined based on the health information.

In some implementations, a computer-implemented method performed by an asset replacement optimization system includes obtaining health information identifying different measures of health of a plurality of assets of a system; and determining an appropriate time to replace an asset of the plurality of assets. The plurality of assets are geographically distributed, wherein the appropriate time is determined based on the health information. The appropriate time optimizes capital allocation and operational expenses while maintaining or improving risk and network availability using predictive models and optimization.

BRIEF DESCRIPTION OF THE DRAWINGS

FIGS. 1A-1F are diagrams of an example implementation described herein.

DETAILED DESCRIPTION

Figure 1A:
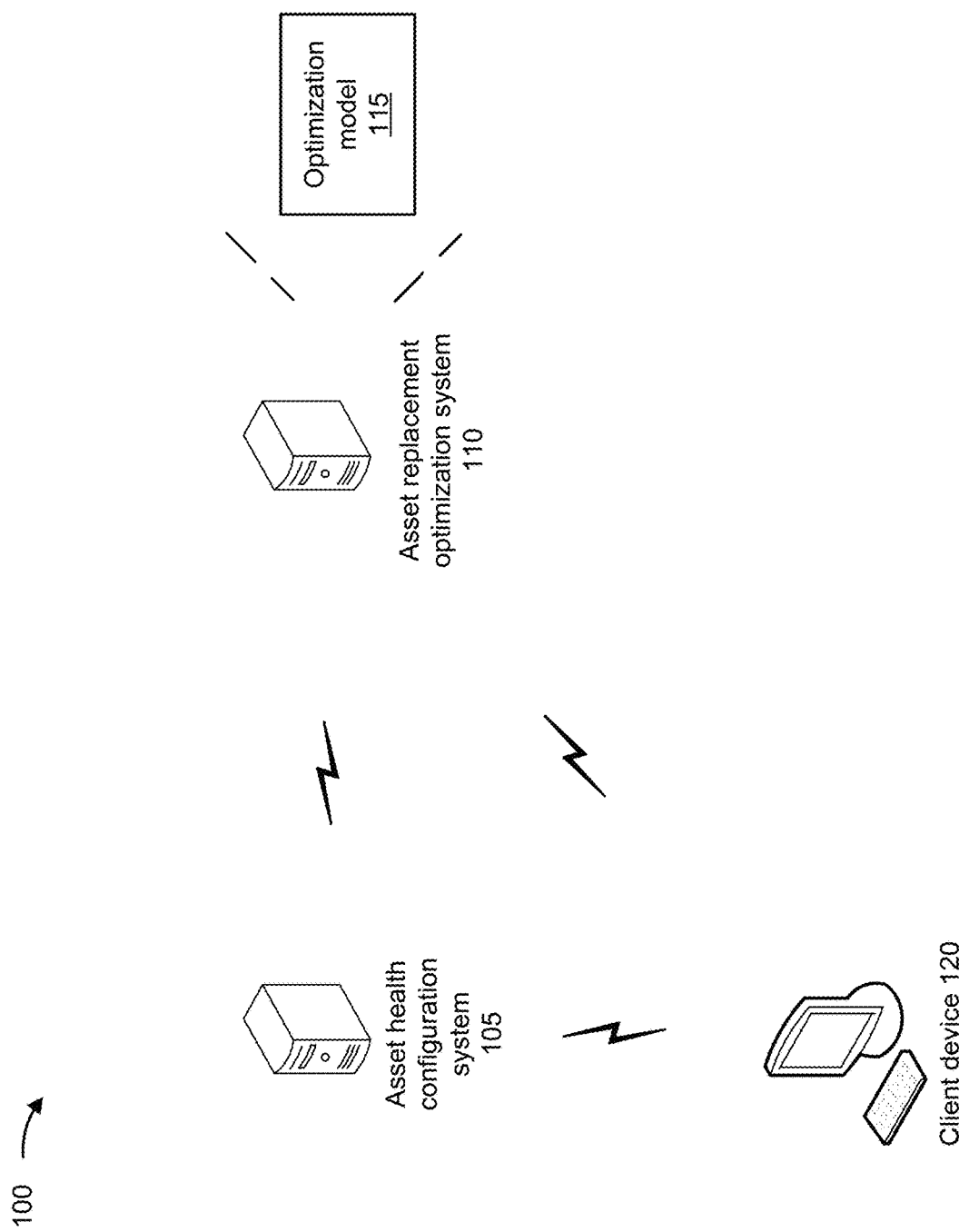

The following detailed description of example implementations refers to the accompanying drawings. The same reference numbers in different drawings may identify the same or similar elements.

Assets may be part of a fleet of assets. The fleet of assets may be monitored and managed using one or more computing devices. For example, the one or more computing devices may monitor the assets to determine measures of health of the assets and determine whether the assets are to be serviced and/or replaced. Currently, monitoring and managing the fleet of assets is subject to multiple challenges.

One challenge relates to the number of the assets that are monitored and managed. For example, such a number may be large (e.g., forty thousand assets). Another challenge relates to working conditions of the assets. For example, a first asset may be operating under a first condition, a second asset may be operating under a second condition different than the first condition, and so on. For instance, the first asset may be overutilized while the second asset may be underutilized.

Yet another challenge relates to the assets being geographically distributed in a large geographical area. In this regard, the assets may be subject to different weather conditions. Yet another challenge relates to a number of dependencies and interaction between the assets. For example, the second asset may operate based on an output from the first asset. Still yet another challenge relates to minimizing the unscheduled downtime due to failure of the assets. For example, the first assets may experience an unexpected failure. Such an expected failure may cause an unscheduled downtime for the second asset.

In some situations, the assets may not be subject to regular maintenance and may not be subject to regular physical inspection. In this regard, the one or more computing devices may be used to determine preventive replacement of the assets to ensure improvement with respect to availability, utilization, and performance of the assets. Determining preventive replacement of the fleet of assets in light of the challenges mentioned above consumes a significant amount of computing resources, storage resources, and/or network resources, among other examples.

Currently, the one or more computing devices are only capable of determining assets that are to be replaced. However, the one or more computing devices are unable to determine when such assets are to be replaced. Furthermore, the one or more computing devices are using two-dimensional inputs to determine assets that are to be replaced. The two-dimensional inputs include risk scores (e.g., failure risk score) for the assets and impact scores for the assets. The risk scores are static. For example, the one or more computing devices are unable to determine new risk scores after replacements of the assets.

Additionally, the one or more computing devices are unable to take into account business and operational constraints (e.g., budget, replacement cost, labor, among other . . . examples). Currently, the process of determining a replacement schedule, that takes account business and operational constraints, is performed manually. In some situations, the one or more computing devices may utilize a non-linear model to determine the assets that are to be replaced. A non-linear model may utilize a non-linear regression that uses a non-linear equation. Using the non-linear model in this manner is a time consuming process. For example, determining the assets to be replaced using the non-linear model may take a significant period of time (e.g., weeks).

Additionally, using the non-linear model in this manner does not enable scalability. For example, using the non-linear model in this manner does not enable the one or more computing devices to identify assets to be replaced when the number of assets is large (e.g., approximately ten thousand assets). Accordingly, using the one or more computing devices may consume a significant amount of computing resources, storage resources, and/or network resources, among other examples. Moreover, the inability to overcome the above challenges may cause the assets to be prematurely replaced and/or may cause the assets to experience a failure as a result of untimely replacements of the assets.

Implementations described herein provide solutions to overcome the above challenges of current computing devices that are used to manage a set of assets. For example, implementations described herein automatically schedule replacements of assets. For instance, implementations described herein are directed to an asset replacement optimization system that automatically determines when to perform replacements for a set of assets associated with a project and automatically determines which asset is to be replaced. Replacing assets in this manner optimizes capital allocation and operational expenses while maintaining or improving reliability.

In some examples, the assets may be included in an electric power system (or power system). For instance, the assets may be transformers. Alternatively, the assets may be components of other systems. For example, the assets may include vehicles, devices, machines. In some situations, a number of the assets may be large (e.g., tens of thousands). Additionally, or alternatively, the assets may be geographically distributed.

The asset replacement optimization system allows a reliability engineer to build a project of assets, assign a length of the project, and run multiple strategies to determine which assets are to be replaced over the life of the project and when the assets are to be replaced. The asset replacement optimization considers various inputs such as a list of assets, current health conditions of the assets, and predicted states of the assets. The strategies may be guided by operational and business data such as failure costs of the assets and/or replacement costs of the assets. The asset replacement optimization may receive, as business input, business constraints such as budget and risk factors. The output, generated by the asset replacement optimization, is a replacement schedule.

In some examples, the asset replacement optimization system may receive asset inputs (e.g., input regarding health conditions of the assets) and business inputs (e.g., input regarding budget and risk constraints associated with the assets). The asset inputs may include hazard . . . curves of the assets, effective ages of the assets, and predicted risks for the assets (e.g., predicted risk of failure of the assets). The hazard curve of an asset may be determined based on an end of life curve of the asset. The end of life curve may indicate an amount of time during which the asset may be operational.

The business inputs may include cost inputs regarding cost associated with the assets and strategy inputs regarding the assets. The cost inputs may include failure costs associated with repairing failures of the assets and replacement costs associated with replacing the assets (e.g., operating expenses and capital expenses associated with the assets). The strategy inputs may identify a total budget for the project, operating expenses for the project, capital expenses for the project, and a target risk score for the project. The target risk score may be used to maintain a measure of risk associated with the project or reduce the measure of risk associated with the project.

Based on the asset inputs and the business inputs, the asset replacement optimization system may formulate an optimization problem. For example, the asset replacement optimization system may determine a schedule for replacement of a single asset (of the set of assets). For example, the asset replacement optimization system may identify a time to replace the single asset over a period of time associated with the project. For instance, based on the asset inputs and the business inputs, the asset replacement optimization system may determine the schedule in a manner that minimizes a cost rate per time interval.

Additionally, or alternatively, the asset replacement optimization system may determine a schedule for replacement of a group of assets. As an example, the asset replacement optimization system may use the schedule for replacement of the single asset to determine the schedule for replacement on a global level considering all assets and appropriate business inputs.

In contrast to existing systems for asset management, the asset replacement optimization system may use a linear model to determine the schedule for replacement. The linear model may utilize linear equations to model the replacement impact and constraints. Additionally, in contrast to existing systems for asset management, the asset replacement optimization system utilizes a decomposition optimization algorithm with respect to determining schedules for replacements of a large quantity of assets (e.g., tens of thousands of assets). For example, the decomposition optimization algorithm may decompose the period of time associated with the project into multiple periods of time. The asset replacement optimization system may determine an asset to be replaced in one or more periods of time and determine a time to replace the asset in each of the one or more periods of time.

Using the linear model and the decomposition optimization algorithm in this manner enables scalability with respect determining schedules for replacements of assets. For example, using the linear model (instead of a non-linear model) significantly increases a speed of determining the schedule for replacements of assets (e.g., a ten-time improvement over using the non-linear model). Additionally, by decomposing the period of time as explained herein, the asset replacement optimization system may improve a size (or quantity) of assets for the projects (e.g., a ten-time improvement with respect the size of assets for existing systems for asset management).

For at least the foregoing reasons, implementations described herein may preserve computing resources, network resources, and other resources that would have otherwise been used by existing asset management systems to determine schedules for replacement of assets.

FIGS. 1A-1F are diagrams of an example implementation 100 described herein. As shown in FIGS. 1A-1F, example implementation 100 includes an asset health configuration system 105, an asset replacement optimization system 110, and a client device 120. These devices are described in more detail below in connection with FIG. 2 and FIG. 3.

Asset health configuration system 105 may include one or more devices configured to receive, generate, store, process, and/or provide information associated with determining schedules for replacements of assets, as explained herein. For example, asset health configuration system 105 may be configured to compute measures of health of assets (e.g., health scores of the assets).

Asset replacement optimization system 110 may include one or more devices configured to receive, generate, store, process, and/or provide information associated with determining schedules for replacements of assets, as explained herein. For example, asset replacement optimization system 110 may be configured to receive asset inputs from asset health configuration system 105 and/or from client device 120 regarding the assets. Based on the asset inputs and the business inputs, asset replacement optimization system 110 may determine a schedule for replacement of the assets. As shown in FIGS. 1A-1F, asset replacement optimization system 110 may include an optimization model 115. Optimization model 115 may include a machine learning model configured to determine optimal schedules for replacement of assets.

Client device 120 may include one or more devices configured to receive, generate, store, process, and/or provide information associated with determining schedules for replacements of assets, as explained herein. For example, client device 120 may be configured to provide information regarding assets. Additionally, or alternatively, client device 120 may be configured to provide information regarding budget and risk constraints associated with the assets. In some examples, client device 120 may be a device of a reliability engineer and/or a device of a data scientist.

Figure 1B:
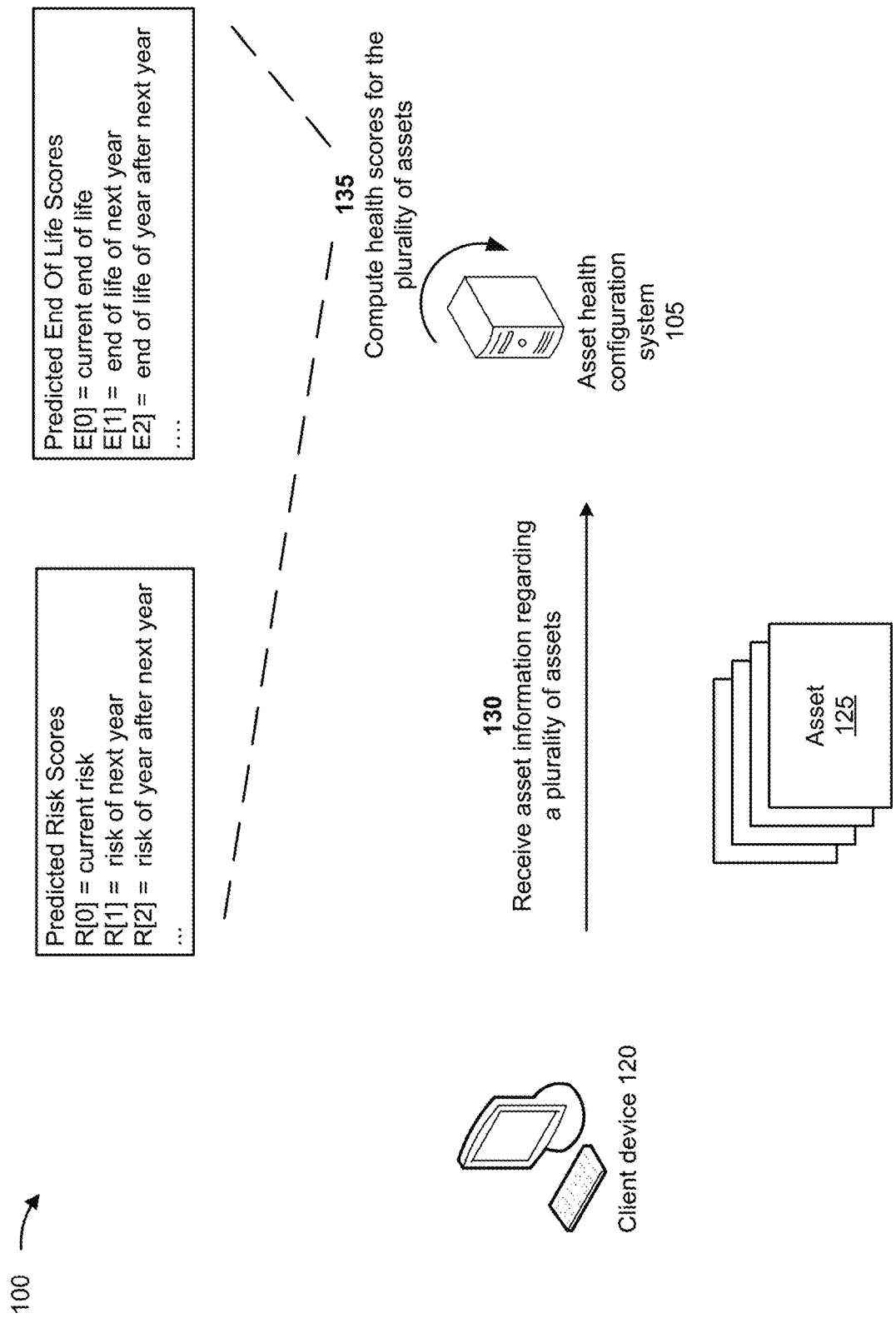

As shown in FIG. 1B, and by reference number 130, asset health configuration system 105 may receive asset information regarding a plurality of assets. For example, asset health configuration system 105 may receive the asset information regarding a plurality of assets 125 from client device 120. For instance, a reliability engineer (and/or a data scientist) may use client device 120 to provide the asset information in order to determine optimal schedules for replacement of assets 125.

In some examples, assets 125 may be included in an electric power system (or power system). For instance, assets 125 may be transformers. Alternatively, assets 125 may be components of other systems. For example, assets 125 may include vehicles, devices, machines. In some situations, a number of the assets may be large (e.g., tens of thousands). Additionally, or alternatively, assets 125 may be geographically distributed.

In some examples, the asset information may identify one or more manufacturers of assets 125, one or more models of assets 125, one or more types of assets 125, one or more sites associated with assets 125 (e.g., a geographical location), and/or one or more failure classes associated with assets 125, among other examples. The asset information may include identifiers of assets 125. In some examples, the asset information may indicate that assets 125 are part of a project (e.g., a new project or an existing project). In this regard, the asset information may identify a start date of the project, a duration of the project, an end date of the project, among other examples.

As shown in FIG. 1B, and by reference number 135, asset health configuration system 105 may compute health scores for the plurality of assets. For example, asset health configuration system 105 may compute scores relating to health conditions of the assets. The health scores may include health indexes, criticality scores, effective ages, end of life scores, and risk scores for assets 125. In some examples, asset health configuration system 105 may use a risk model to compute health indexes and criticality scores for assets 125. For example, a health index for an asset may be a weighted aggregation of certain drivers which may, in turn, be a weighted average of other factors such as health condition or age. A criticality score for an asset may be a combination of one or more factors. As an example, the criticality score may be measured based on a number of business users using the asset. For instance, the criticality score of an asset associated with a hospital may exceed the criticality score of an asset associated with a residential neighborhood.

In some examples, the effective age may be based on a combination of an installation date and a health index. For example, the effective age may be based on the installation date and an amount of usage of the asset. In this regard, the effective age of the asset may be different than a calendar age. For instance, the asset may not age beyond the installation date of the asset if the asset is not utilized. Conversely, the asset may age more rapidly than a calendar age if the asset is being used excessively.

The end of life score may be computed based on decommission data regarding decommissioned assets that are similar to the asset (e.g., similar manufacturer, similar model, similar type of usage, and/or similar amount of usage). In this regard, the end of life of the asset may be computed based on a period of time (identified by the decommission data) during which the decommissioned assets were operational. In some situations, the end of life may be combined with the effective age of the asset to obtain a representation of how long the asset can remain operational.

In some situations, the end of life score may be determined using an end of life model. As shown in FIG. 1B, in some situations, the end of life of the asset may be determined for a current year, for a following year, for a subsequent year, among other examples.

The risk score of an asset may be measured by the end of life score and the criticality score. The risk score of the asset may indicate a likelihood of the asset experiencing a failure. In this regard, a frequency of occurrence of a failure may increase as the asset ages.

In some situations, the risk score may be determined using an end of life model. As shown in FIG. 1B, in some situations, the end of life of the asset may be determined for a current year, for a following year, for a subsequent year, among other examples. In some examples, a reliability engineer and/or a data scientist may use client device 120 to adjust values of the health scores.

Figure 1C:
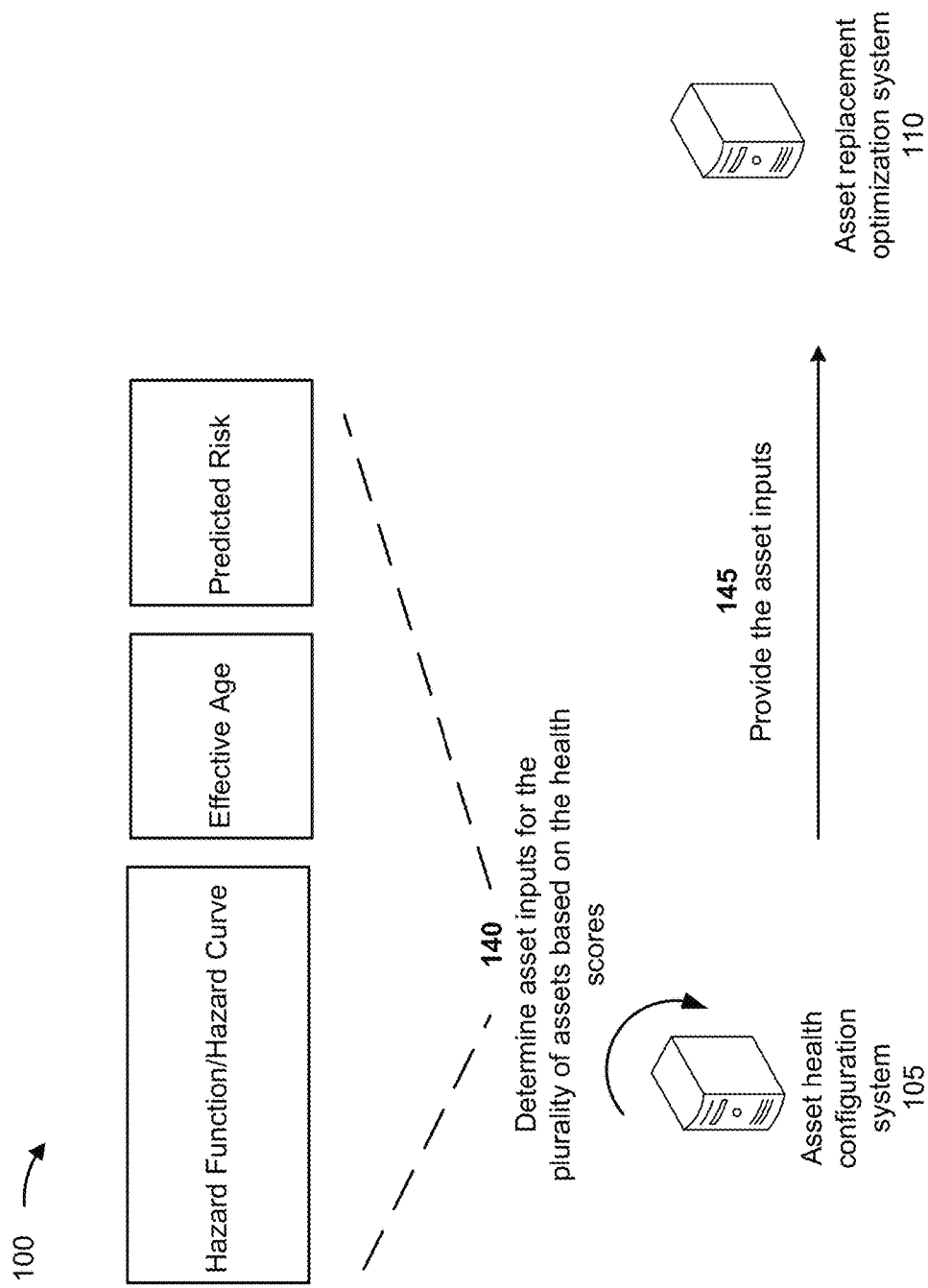

As shown in FIG. 1C, and by reference number 140, asset health configuration system 105 may determine asset inputs for the plurality of assets based on the health scores. For example, based on the health scores, asset health configuration system 105 may determine hazard curves for the assets, effective ages of the assets, and predicted risks for the assets. In some implementations, asset health configuration system 105 may determine a hazard curve of an asset using an end of life curve of the asset with a Weibull distribution using the . . . decommissioned data regarding decommissioned assets. The decommissioned data the decommissioned assets may indicate how long the decommissioned assets remained operational.

Alternatively to using the Weibull distribution, asset health configuration system 105 may determine the hazard curve using a distribution that is different than the Weibull distribution. Alternatively to using the Weibull distribution, asset health configuration system 105 may receive (e.g., from client device 120) information regarding a manner in which the asset operates and may use the information in a Weibull distribution.

In some implementations, asset health configuration system 105 may determine the effective age of an asset based on a current effective age of the asset and an amount of time following the current effective age of the asset. The current effective age may be determined based on an input from client device 120. Alternatively, asset health configuration system 105 may determine the effective age of the asset based on the installation date of the asset.

In some implementations, asset health configuration system 105 may determine the predicted risk of an asset (e.g., predicted risk of failure of the asset) using a measure of criticality of the asset and an end of life curve of the asset. For example, asset health configuration system 105 may determine the predicted risk using the following formula:

$$\text{Risk}(T) = \text{criticality} * EOLCurve[\text{Effective Age} + T], \quad (1)$$

where Risk(T) is the predicted risk at a time T, where criticality is the measure of criticality of the asset, where EOLCurve is the end of life curve of the asset, where T=0,1,2,3,4, etc.

Alternatively, asset health configuration system 105 may determine the predicted risk using the following user custom formula:

$$\text{Risk} = F(\text{Health, Criticality}), \text{Risk}(T) = G(F(\text{Health, Criticality}), T), \quad (2)$$

where Health is the base health condition of the asset, where criticality is the measure of criticality of the asset, where F(.) is a conventional risk formula (e.g., criticality*EOLCurve), G(.) is the user custom health formula, and where T is time.

Alternatively, asset health configuration system 105 may provide an extension point to generate predicted risk from a current risk. Based on the foregoing, asset health configuration system 105 may enable various definitions for the asset inputs.

As shown in FIG. 1C, and by reference number 145, asset health configuration system 105 may provide the asset inputs. For example, after determining the asset inputs, asset health configuration system 105 may provide the asset inputs to asset replacement optimization system 110.

Figure 1D:
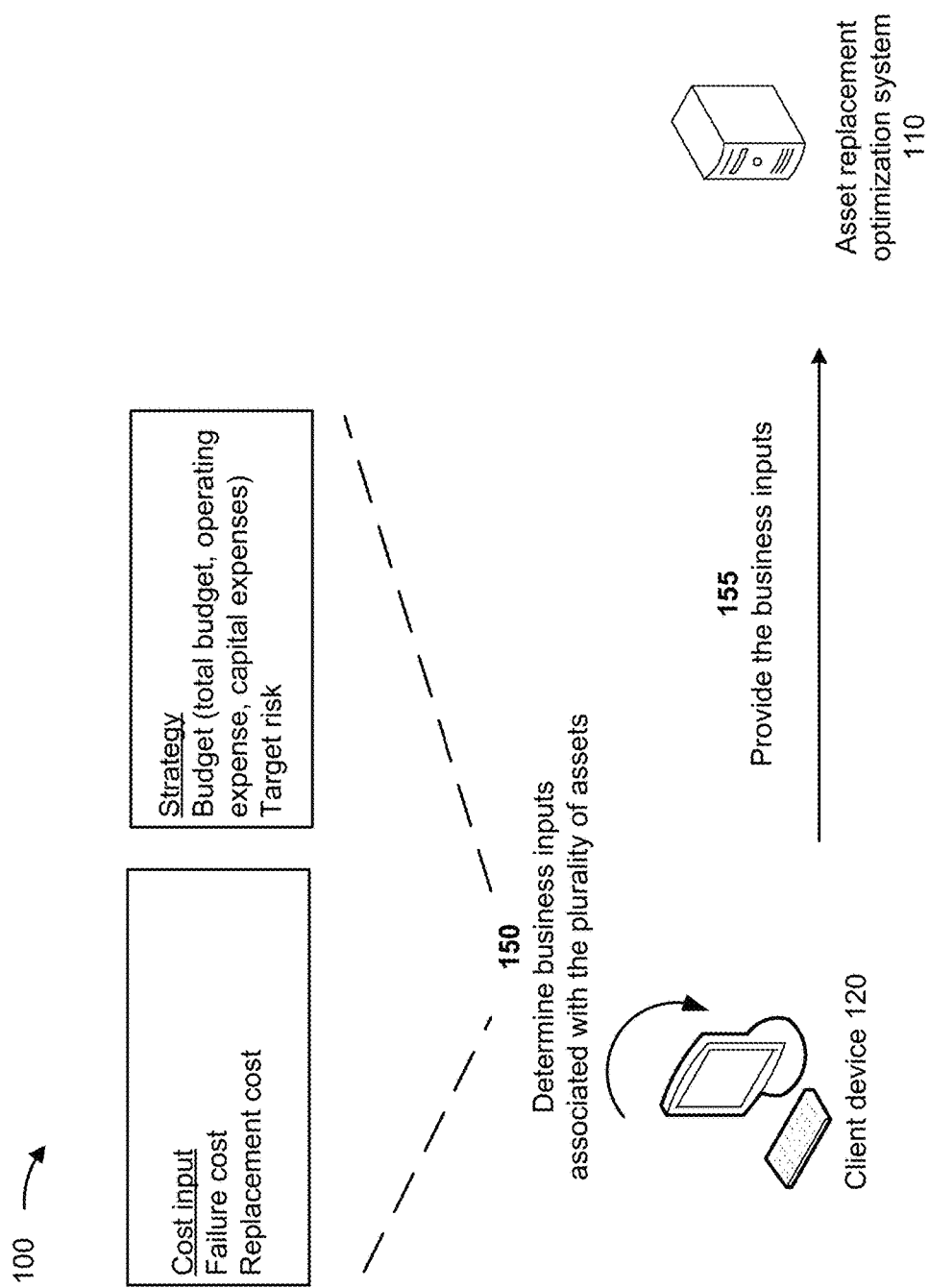

As shown in FIG. 1D, and by reference number 150, client device 120 may determine business inputs associated with the plurality of assets. For example, asset health configuration system 105 may determine the business inputs based on receiving the asset information regarding the plurality of assets 125 from client device 120.

The business inputs may include cost inputs regarding cost associated with the assets and strategy inputs regarding the assets. The cost inputs may include failure costs associated with repairing failures of assets 125 and replacement costs associated with replacing assets 125 (e.g., operating expenses and capital expenses associated with the assets). The strategy inputs may identify a total budget for the project, operating expenses for the project, capital expenses for the project, and a target risk score for the project. The target risk score may be used to maintain a measure of risk associated with the project or reduce the measure of risk associated with the project.

In some examples, the business input may identify one or more strategies for the project. The first strategy (e.g., for maintaining risk) may determine which assets need to be replaced and when the assets need to be replaced, in order to maintain an average risk of the project over the life of the project. The average risk may be the average of the individual assets in the project. The second strategy (e.g., for reducing risk) may enable selecting the average risk score for the project. The second strategy will determine which assets need to be replaced and when the assets need to be replaced, in order to maintain a desired risk of the project over the life of the project.

The third strategy (e.g., for staying in budget) enable selection of a budget for the project. The third strategy will determine which assets need to be replaced, and when, in order to stay within a budget for the project. In some examples, client device 120 may provide a budget for the third strategy and provide a risk for the first strategy. Asset replacement optimization system 110 may enable comparison of multiple strategies.

As shown in FIG. 1D, and by reference number 155, asset health configuration system 105 may provide the business inputs. For example, after determining the business inputs, asset health configuration system 105 may provide the business inputs to asset replacement optimization system 110.

Figure 1E:
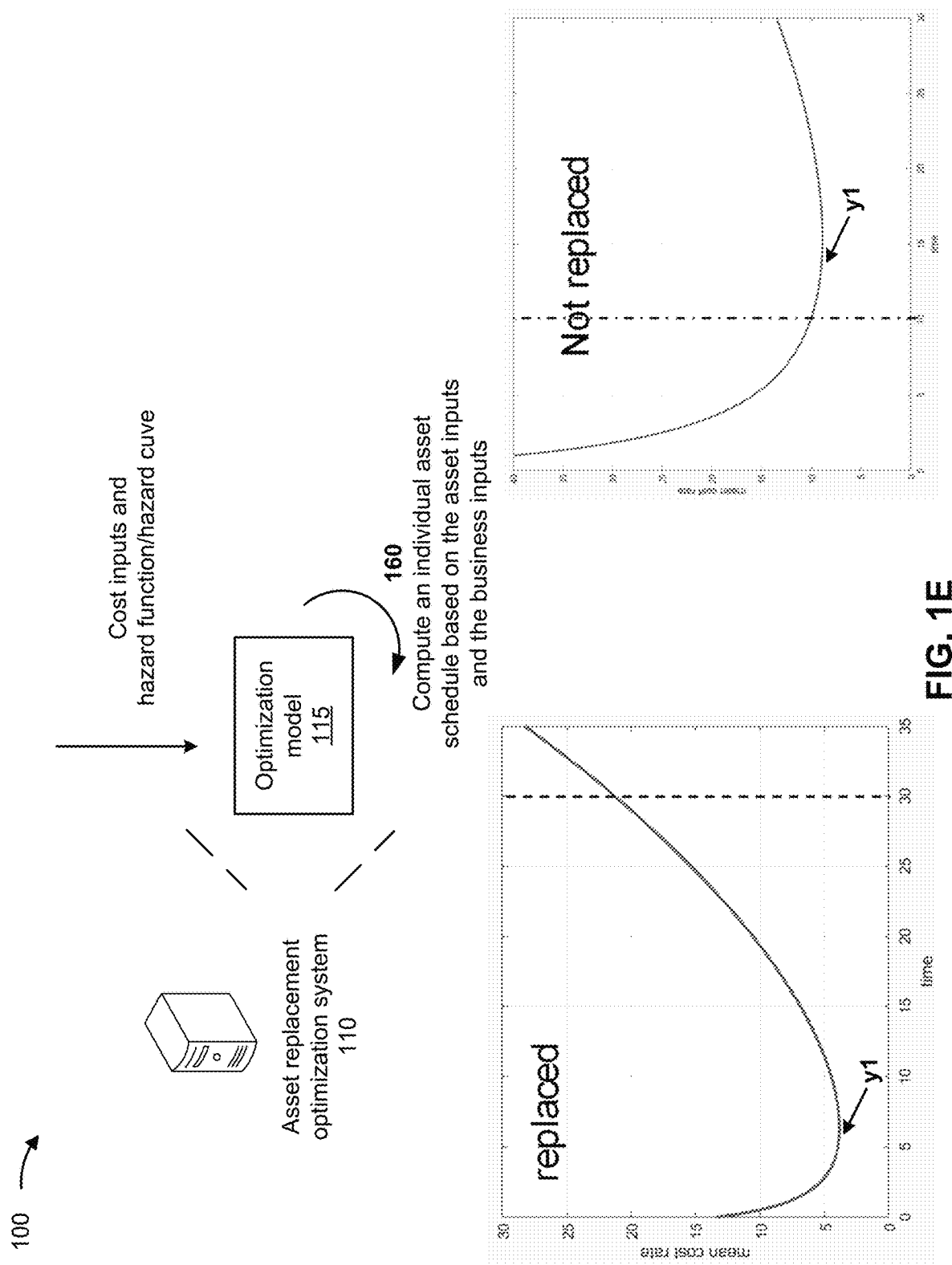

As shown in FIG. 1E, and by reference number 160, asset replacement optimization system 110 may compute an individual asset schedule based on the asset inputs and the business inputs. For example, asset replacement optimization system 110 may determine a schedule for replacement of an individual asset 125 based on the cost inputs associated with the asset 125. Asset replacement optimization system 110 may determine the schedule for replacement of the individual asset 125 using optimization model 115.

The schedule for replacement the individual asset 125 may refer to a time (e.g., a date and/or a time) when the individual asset 125 is to be replaced. In this regard, asset replacement optimization system 110 may determine the schedule for replacement of the individual asset 125 for the purpose of minimizing a cost rate of the individual asset over a period of time. In other words, asset replacement optimization system 110 may minimize the cost associated with the individual asset 125 over the period of time. The period of time may be a utilization duration (e.g., an anticipated amount of time during which the individual asset may be used).

When determining the schedule for replacement, asset replacement optimization system 110 may consider parameters associated with the project. The parameters may include the period of time ($\bar{t}$), a start date (t0), a schedule interval of (e.g., monthly, quarterly (0.25 year), semiannually, among other examples), and a total interval numbers (I)

$$\left(e.g., \frac{\bar{t}}{0.25}\right).$$

For each individual asset, asset replacement optimization system 110 may consider multiple inputs. The inputs may include the end of life curve for the individual asset, a hazard curve for the individual asset, a cumulative hazard function for the individual asset ($H(t) = -\ln R(t)$, $R(t) = 1 - F(t)$, $F(t)$ is the cumulative distribution function), a current effective age ($\gamma_0$), a failure cost ($c_m$), and a replacement cost ($c_r$). The end of life curve may indicate a failure probability at future effective age (e.g., index=0 means end of life calculated date). In some examples, the input may include a normalized end of life curve (index=0 means y0=failure prob for project start date).

Asset replacement optimization system 110 may determine the optimal interval index $$t^n, t^n = 0, 1, \ldots, \frac{\bar{t}}{0.25}$$

to minimize the cost rate f using the following formula:

$$\min_{y_1} f(y_1) = \frac{c_r + c_m \int_{y_0}^{y_0+y_1} H(t)dt}{y_1 + y_0} = \quad (3)$$

$$\frac{c_r + c_m(\ln R(y_0) - \ln R(y_0 + t^n \times 0.25))}{y_0 + t^n \times 0.25}$$

s.t. $y_1 \geq 0$ or $t^n \in [0, 1, 2, \ldots]$

Asset replacement optimization system 110 may utilize the above formula to minimize the cost for the individual asset 125 per time interval. Asset replacement optimization system 110 may solve for the optimal value of y1 to minimize the cost rate. For each individual asset 125, asset replacement optimization system 110 may produce an output indicating whether the individual asset 125 is to be replaced over the period of time (of anticipated use).

Asset replacement optimization system 110 may identify the optimal value of y1 (e.g., the replacement interval index). If the optimal value of y1 occurs after the period of time (of the utilization duration), the individual asset is not to be replaced. Conversely, if the optimal value of y1 occurs during the period of time (of the utilization duration), the individual asset is to be replaced at time y0+y1. The optimal value for y1=t*0.25 is determined by exhaustive search on the value of t in [0,1, . . . , $\bar{t}$/0.25].

As shown in FIG. 1F, and by reference number 165, asset replacement optimization system 110 may compute a group schedule based on the business inputs. For example, asset replacement optimization system 110 may determine a schedule for replacement of a group of assets. In this regard, asset replacement optimization system 110 may consider global constraints to an optimal schedule for all assets. The global constraints may include the business inputs relating to cost.

In some implementations, asset replacement optimization system 110 may determine the schedule for replacement by formulating a problem to be solved. Asset replacement optimization system 110 may formulate the problem using the following formula:

$$\min_{x_i^n \in \{0,1\}} \sum_{i \in I, n \in N} x_i^n * \text{cost\_rate}_i^n * crt^n + \alpha_{budget}\left(m - \sum_{i \in I}\left(\sum_{n \in N} \rho_n x_i^n\right)\right) \quad (4)$$

In this regard, $x_i^n$ may be a binary variable indicating whether a replacement is conducted for the n-th asset during the i-th time interval. As explained above, the time interval may be monthly, quarterly, semiannually, among other examples.

With respect to the formula above, asset replacement optimization system 110 may consider multiple inputs. The inputs may include the set of assets (N), the set of time intervals (I), a value ($k^n$) indicating whether a possible replacement for the n-th asset occurred, a predicted risk ($r_n^i$) per i-th time intervals for the n-th asset, the cost rate (cost\_rate$^n_i$) for the n-th asset at the i-th time interval, the criticality (crt$^n$) of the n-th asset, the cost ($\rho_n$) for a replacement of the n-th asset, the total budget availability (m), the average risk limit ($\bar{\text{ri}}$) for all assets during I time intervals, the average risk (total) ($\bar{r}$), and the penalty parameter ($\alpha_{budget}$) for budget underused (0.1*m/maxi,n (cost\_ratein*crtn)).

Asset replacement optimization system 110 may consider the following constraints:

Number of replacement for the n-th transformer.

$$\sum_{i \in I} x_i^n \leq 1, n \in N$$

Total budget $$0.90 * m \leq \sum_{i \in I}\left(\sum_{n \in N} \rho_n x_i^n\right) \leq m$$

or Average risk (total or quarterly)
for the total risk:

$$\frac{\sum_{i \in I} \sum_{n \in N}\left(1 - \sum_{j=0}^{i} x_j^n\right) r_i^n}{N} \leq \bar{r}$$

for each $i \in I$:

$$\frac{\sum_{n \in N}\left(1 - \sum_{j=0}^{i} x_j^n\right) r_i^n}{N} \leq \bar{r}_I \qquad (5)$$

System availability and other operational constraints

The above formula (formula (4)) utilizes linear equations. Utilizing linear equations increases a speed of computation to determine the schedule of replacement (of an asset 125) with respect to a speed of computation of non-linear equations.

In some situations, the group of assets 125 may exceed a threshold number of assets for which a current scheduling method can solve. In this regards, asset replacement optimization system 110 may decompose the problem (of determining the schedule for replacement of a group of assets) into multiple components. For example, asset replacement optimization system 110 may identify year buckets. In this regard, asset replacement optimization system 110 may generate the following formula:

$$\min_{y_t^n \in \{0,1\}} \sum_{t \in [1,\ldots,T_Y], n \in N} y_t^n * \text{cost\_rate\_years}_t^n * crt^n + \qquad (5)$$

$$\alpha_{budget}\left(m - \sum_{t \in [1,\ldots,T_Y], n \in N} \rho_n y_t^n\right)$$

In this regard, $y_n^t$ may be a binary variable indicating whether a replacement is conducted for the n-th asset during the t-th time interval (in year buckets).

With respect to the above formula, asset replacement optimization system 110 may consider multiple inputs. The inputs may include the set of assets (N), the set of year buckets (in years), a set of time intervals (I); a binary value ($k^n$) indicating whether a possible replacement for the n-th asset, the predicted risk for the t-th year bucket ($r\_years_t^n$) for the n-th asset: $r\_years_t^n = \Sigma_{i\ in\ the\ set\ of\ quarters\ in\ Y_t} r_i^n$, the cost rate (cost_rate$_n$) for the n-th asset at the i-th interval, the criticality (crt$_n$) of the n-th asset, the cost ($\rho_n$) for a replacement of the n-th asset, the total budget availability (m), the average risk limit ($\bar{r}i$) for all assets during I time intervals, the average risk (total) ($\bar{r}$), and the penalty parameter ($\alpha_{budget}$) for budget underused. The cost rate for each year bucket (cost_rate_years$_t^n$) for the n-th asset at the t-th year bucket may consider the cost rate of the middle point of the t-th year bucket.

An example of the year buckets for an utilization duration (or an investment plan duration) $\bar{t}=100$ may be as follows $\{1,\ldots,100\}=\{\{1,\ldots,5\}, \{6,\ldots,10\},\ldots,\{96,\ldots,100\}\}$, $Y_1=\{1,\ldots,5\}$, $Y_2=\{6,\ldots,10\}\ldots$, $t=1,\ldots,T_Y$ (e.g., the number of year buckets $T_Y=25$).

Asset replacement optimization system 110 may consider the following constraints (e.g., for a set of transformers in the power system):

Number of replacement for the n-th transformer $$\sum_{t \in [1,\ldots,T_Y]} y_t^n \leq 1, n \in N$$

Total budget $$0.90 * m \leq \sum_{t \in [1,\ldots,T_Y], n \in N} \rho_n y_t^n \leq m$$

or Average risk (total or year brackets)

$$\text{risk:} \frac{\sum_{t \in [1,\ldots,T_Y]} \sum_{n \in N}\left(1 - \sum_{j=s}^{t} y_j^n\right) r\_years_t^n}{N} \leq \bar{r}$$

for the total risk:

$$\frac{\sum_{n \in N}\left(1 - \sum_{j=0}^{t} y_j^n\right) r\_years_t^n / |Y_t|}{N} \leq \bar{r}_1$$

for each $t \in [1,\ldots,T_Y]$:

The above formulas decompose the problem (of determining the schedule for replacement of a group of assets) into multiple components. Utilizing linear equations increase a speed of computation to determine the schedule of replacement with respect to a speed of computation of non-linear equations.

Asset replacement optimization system 110 may determine the schedule for replacements in each year bucket using the following formulas:

$$\min_{x_i^n \in \{0,1\}} \sum_{i \in Y_t, n \in N} x_i^n * \text{cost\_rate}_i^n * crt^n + \qquad (6)$$

$$\alpha_{budget}\left(m_t - \sum_{i \in Y_t}\left(\sum_{n \in N} \rho_n x_i^n\right)\right)$$

$$\min_{x_i^n \in \{0,1\}, r_i^{over}} \sum_{i \in Y_t, n \in N} x_i^n * \text{cost\_rate}_i^n * crt^n +$$

$$\alpha_{budget}\left(m_t - \sum_{i \in Y_t}\left(\sum_{n \in N} \rho_n x_i^n\right)\right) + \alpha_{risk} \sum_{i \in Y_t} r_i^{over}$$

(where the risk bound for each time interval is considered).

With respect to the above formulas, asset replacement optimization system 110 may consider the following inputs the set of assets (NYt) in Yt where $\gamma_{tn}=1$, the set of time intervals (IYt) in Yt, a binary value $k_{yt}^n$ indicating whether a possible replacement for the n-th asset, the predicted risk $r_i^n$ per i-th intervals for the n-th asset, the cost rate (cost_rate$_i^n$) for the n-th asset at the i-th interval, the criticality (crt$_n$) of the n-th asset, the cost ($\rho_n$) for a replacement of the n-th asset, the average risk limit ($\bar{r}_{Yt}=\bar{r}/T_Y$) for all assets during Yt, the average risk (total) ($\bar{r}$), $i \in Yt$ should be understood in terms of quarters in Yt, the budget (m$_t$) used in during Yt calculated from the previous problem, and the penalty parameter ($\alpha$risk) for risk overvalued=

$$10 * \frac{\bar{r}_I}{\max_{i,n}(\text{cost\_rate}_i^n * crt^n)}.$$

Asset replacement optimization system 110 may consider the following constraints:

Number of replacement for the n-th transformer $$\sum_{i \in Y_t} x_i^n = 1, n \in N$$

Total budget $$0.90 * m_t \leq \sum_{i \in Y_t}\left(\sum_{n \in N} \rho_n x_i^n\right) \leq m_t$$

or Average risk (total or quarterly)

$$\frac{\sum_{i \in Y_t} \sum_{n \in N} \left(1 - \sum_{j=0}^{i} x_j^n\right) r_i^n}{N_{yt}} \leq \bar{r}_{Y_t}$$

for the total risk:

$$\frac{\sum_{n \in N} \left(1 - \sum_{j=0}^{i} x_j^n\right) e_i^n}{N} \leq \bar{r}_I + r_i^{over}, r_i^{over} \geq 0.$$

for each $i \in Y_t$:

As shown in FIG. 1F, and by reference number 170, asset replacement optimization system 110 may perform risk minimization operation. For example, asset replacement optimization system 110 may maintain a risk associated with the project within a risk threshold. For instance, asset replacement optimization system 110 may minimize the risk (to maintain the risk within the risk threshold) using the following formula:

$$\min_{x_i^n \in \{0,1\}, r} r \qquad (7)$$

With respect to the above formula, $x_i^n$ may be a binary variable indicating whether a replacement is conducted for the n-th asset during the i-th interval and r may be an average risk per time interval (e.g., monthly, quarterly, semiannually, among other examples).

With respect to the above formula, asset replacement optimization system 110 may consider multiple inputs. The inputs may include the set of assets (N), the set of time intervals (I), an optimal interval index ($t^n$) for the n-th asset obtained from the first stage: 6-th intervals, a value ($k^n$) indicating whether a possible replacement for the n-th asset occurred, a predicted risk ($r_n^i$) per i-th time intervals for the n-th asset, the cost ($\rho_n$) for a replacement of the n-th asset, the total budget (m) availability, the average risk limit (r) for all assets during I time intervals.

Asset replacement optimization system 110 may consider the following constraints:

Average risk (quarterly)

$$\frac{\sum_{n \in N} \sum_{i \in I} r_i^n x_i^n}{I} = r$$

Average risk bound $$\sum_{n \in N} r_i^n x_i^n \leq (1 + \delta_1)^* r, i \in I (\text{e.g.}, \delta_1 = 0.2)$$

Number of replacement for the n-th transformer $$\sum_{i \in I} x_i^n \leq k_n, n \in N$$
$$x_i^n = 0 \text{ if } i > (1 + \delta_2) t^n \text{ or } i < (1 - \delta_2) t^n (\text{e.g.}, \delta_1 = 0.25)$$

Total budget $$\sum_{i \in I} \left(\sum_{n \in N} \rho_n x_i^n\right) \leq m$$

As shown in FIG. 1F, and by reference number 175, asset replacement optimization system 110 may provide information regarding individual asset schedule and group asset schedule. For example, asset replacement optimization system 110 may provide the information regarding the individual asset schedule (for individual asset 125 as described above) and the information regarding the group asset schedule (for a group of assets 125 as described above) to client device 120.

As explained herein, the asset replacement optimization system selects a set of assets and determines appropriate times for replacements of the assets. In this regard, the asset replacement optimization system reduces operational risk by focusing on the appropriate assets to be replaced, thereby increasing availability of the assets. The asset replacement optimization system reduces unnecessary preventive maintenance, reduces the time to make capital replacement planning decisions, and reduces investment cost. For example, the asset replacement optimization system lowers capital expenditures (e.g., long-term expenses) and lowers operating expenses (e.g., day-to-day expenses).

The asset replacement optimization system provides an improved model for improved decision quality. For example, the asset replacement optimization system provides an improved system-wide scheduling problem: a new objective function and handling infeasibility inputs. Furthermore, the asset replacement optimization system flattens out the system risk for more robust operation. Additionally, the asset replacement optimization system may cover many practical business and operational constraints.

The asset replacement optimization system consumes more common risk quantifiable inputs. Additionally, with respect to determining schedules for replacement of assets, the asset replacement optimization system enables scalability regarding a number of assets and regarding the computing time for determining the schedules for replacement of assets. For at least the reasons described herein, implementations described herein may preserve computing resources, network resources, and other resources that would have otherwise been used by existing asset management systems to determine schedules for replacement of assets.

As indicated above, FIGS. 1A-1F are provided as an example. Other examples may differ from what is described with regard to FIGS. 1A-1F. The number and arrangement of devices shown in FIGS. 1A-1F are provided as an example. A network, formed by the devices shown in FIGS. 1A-1F may be part of a network that comprises various configurations and uses various protocols including local Ethernet networks, private networks using communication protocols proprietary to one or more companies, cellular and wireless networks (e.g., Wi-Fi), instant messaging, Hypertext Transfer Protocol (HTTP) and simple mail transfer protocol (SMTP), and various combinations of the foregoing.

There may be additional devices (e.g., a large number of devices), fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
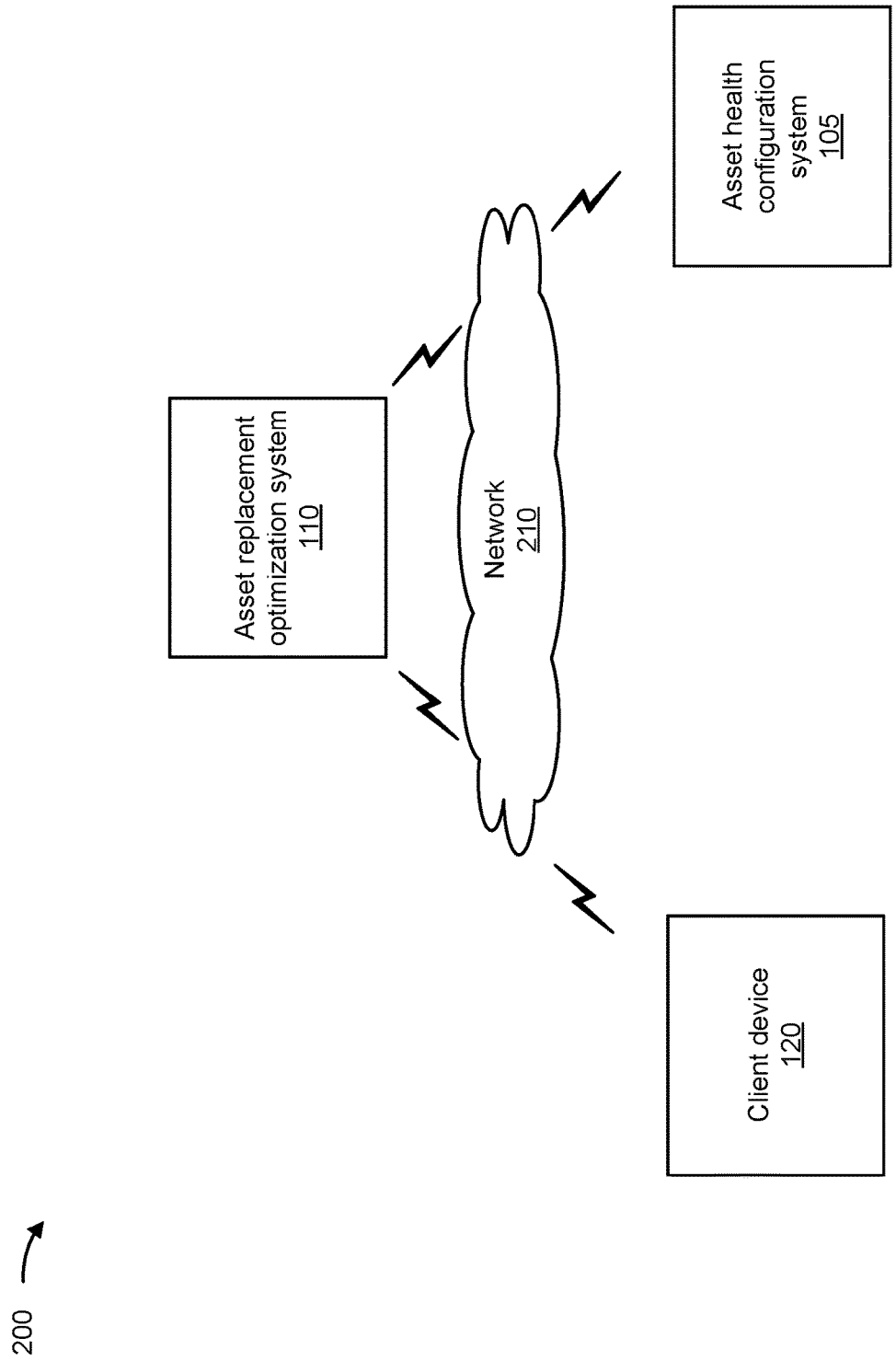
FIG. 2 is a diagram of an example environment in which systems and/or methods described herein may be implemented.

FIG. 2 is a diagram of an example environment 200 in which systems and/or methods described herein can be implemented. As shown in FIG. 2, environment 200 may include asset health configuration system 105, asset replacement optimization system 110, and client device 120. The one or more data structures 215 may correspond to the data structures discussed in connection with FIGS. 1A-1F. Asset health configuration system 105, asset replacement optimization system 110, and client device 120 have been described above in connection with FIG. 1. Devices of environment 200 can interconnect via wired connections, wireless connections, or a combination of wired and wireless connections.

Asset health configuration system 105 may include a communication device and a computing device. For example, asset health configuration system 105 includes computing hardware used in a cloud computing environment. In some examples, asset health configuration system 105 may include a server, such as an application server, a client server, a web server, a database server, a host server, a proxy server, a virtual server (e.g., executing on computing hardware), or a server in a cloud computing system. In some embodiments, asset health configuration system 105 and asset replacement optimization system 110 can be stored on the same device and/or server as part of an asset management system (not shown).

Asset replacement optimization system 110 may include a communication device and a computing device. For example, asset replacement optimization system 110 includes computing hardware used in a cloud computing environment. In some examples, asset replacement optimization system 110 may include a server, such as an application server, a client server, a web server, a database server, a host server, a proxy server, a virtual server (e.g., executing on computing hardware), or a server in a cloud computing system.

Client device 120 may include a communication device and a computing device. For example, client device 120 may include a wireless communication device, a mobile phone, a user equipment, a laptop computer, a tablet computer, a desktop computer, or a similar type of device.

Network 210 includes one or more wired and/or wireless networks. For example, network 210 may include Ethernet switches. Additionally, or alternatively, network 210 may include a cellular network, a public land mobile network (PLMN), a local area network (LAN), a wide area network (WAN), a private network, the Internet, and/or a combination of these or other types of networks. Network 210 enables communication between asset health configuration system 105, asset replacement optimization system 110, and client device 120.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
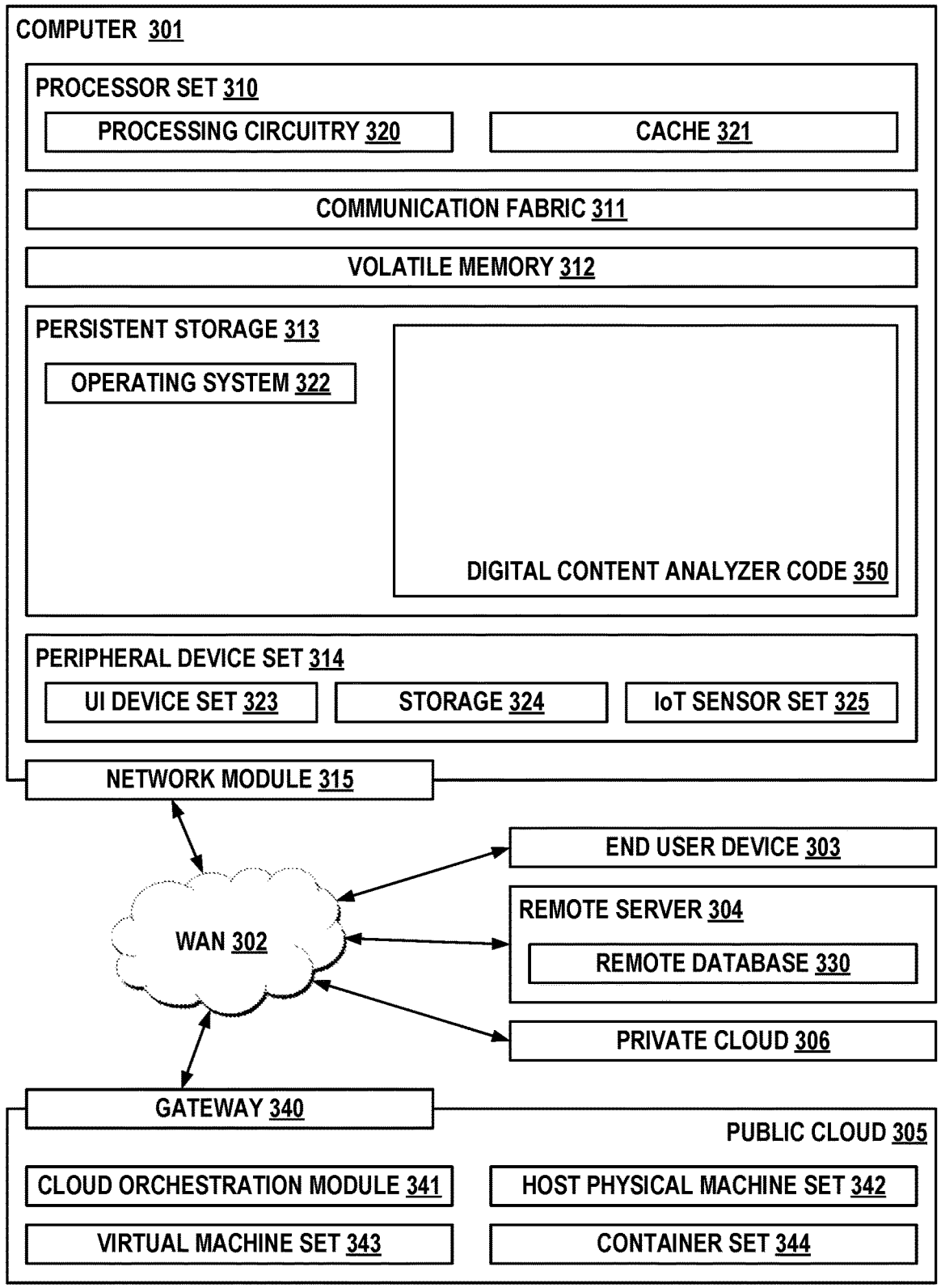
FIG. 3 is a diagram of an example computing environment in which systems and/or methods described herein may be implemented.

FIG. 3 is a diagram of an example computing environment 300 in which systems and/or methods described herein may be implemented. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code involved in performing the inventive methods, such as new digital content analyzer code 350. In addition to block 350, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 350, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

COMPUTER 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 1. On the other hand, computer 301 is not required to be in a cloud except to any extent as may be affirmatively indicated.

PROCESSOR SET 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 350 in persistent storage 313.

COMMUNICATION FABRIC 311 is the signal conduction path that allows the various components of computer 301 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

PERSISTENT STORAGE 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in block 350 typically includes at least some of the computer code involved in performing the inventive methods.

PERIPHERAL DEVICE SET 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of: storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

NETWORK MODULE 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

REMOTE SERVER 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

PUBLIC CLOUD 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs. running inside a container can only use the contents of the container and devices assigned to the container, a feature which is known as containerization.

PRIVATE CLOUD 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

Figure 4:
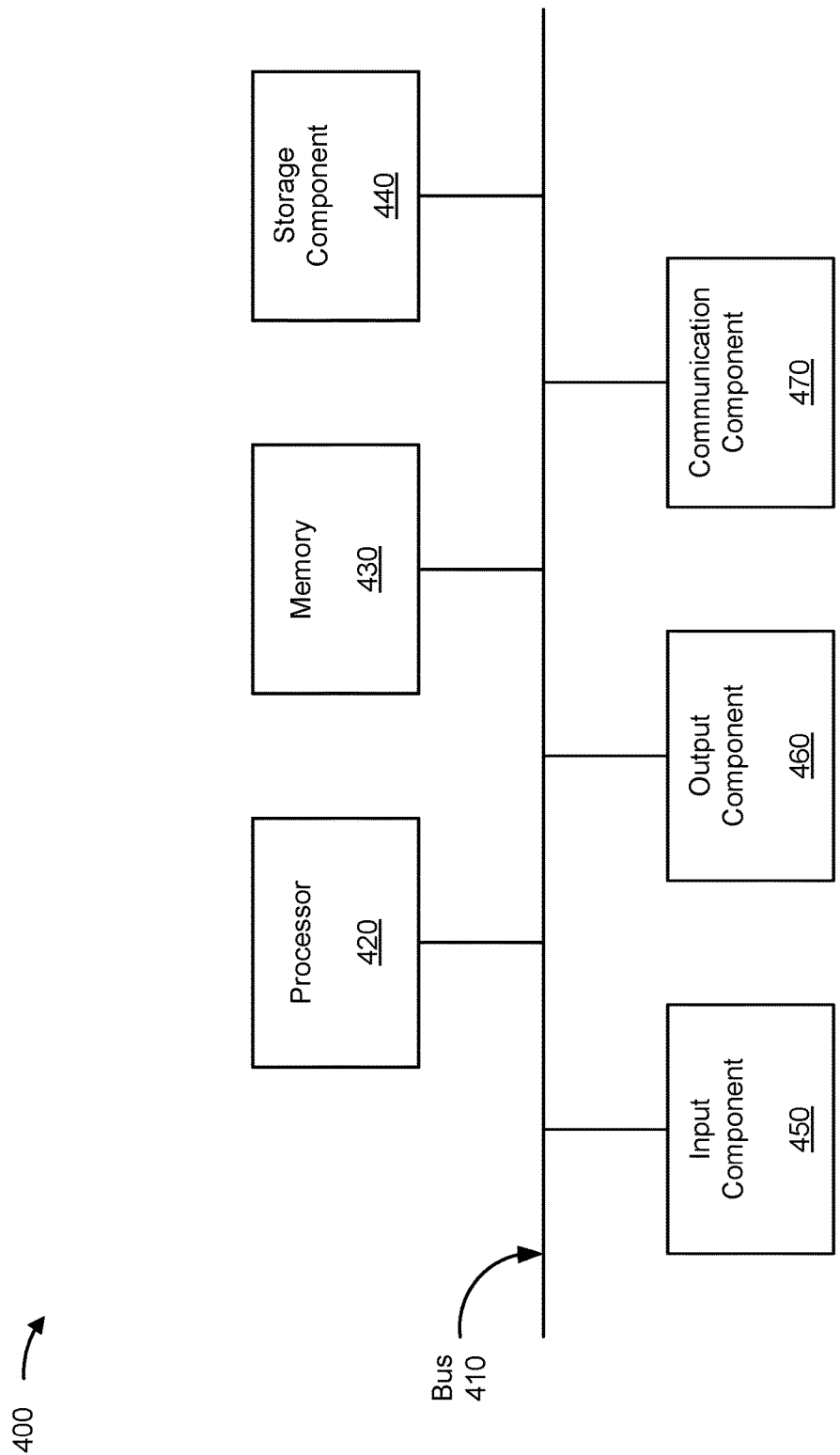
FIG. 4 is a diagram of example components of one or more devices of FIGS. 2 and 3.

FIG. 4 is a diagram of example components of a device 400, which may correspond to asset health configuration system 105, asset replacement optimization system 110, and/or client device 120. In some implementations, asset health configuration system 105, asset replacement optimization system 110, and/or client device 120 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
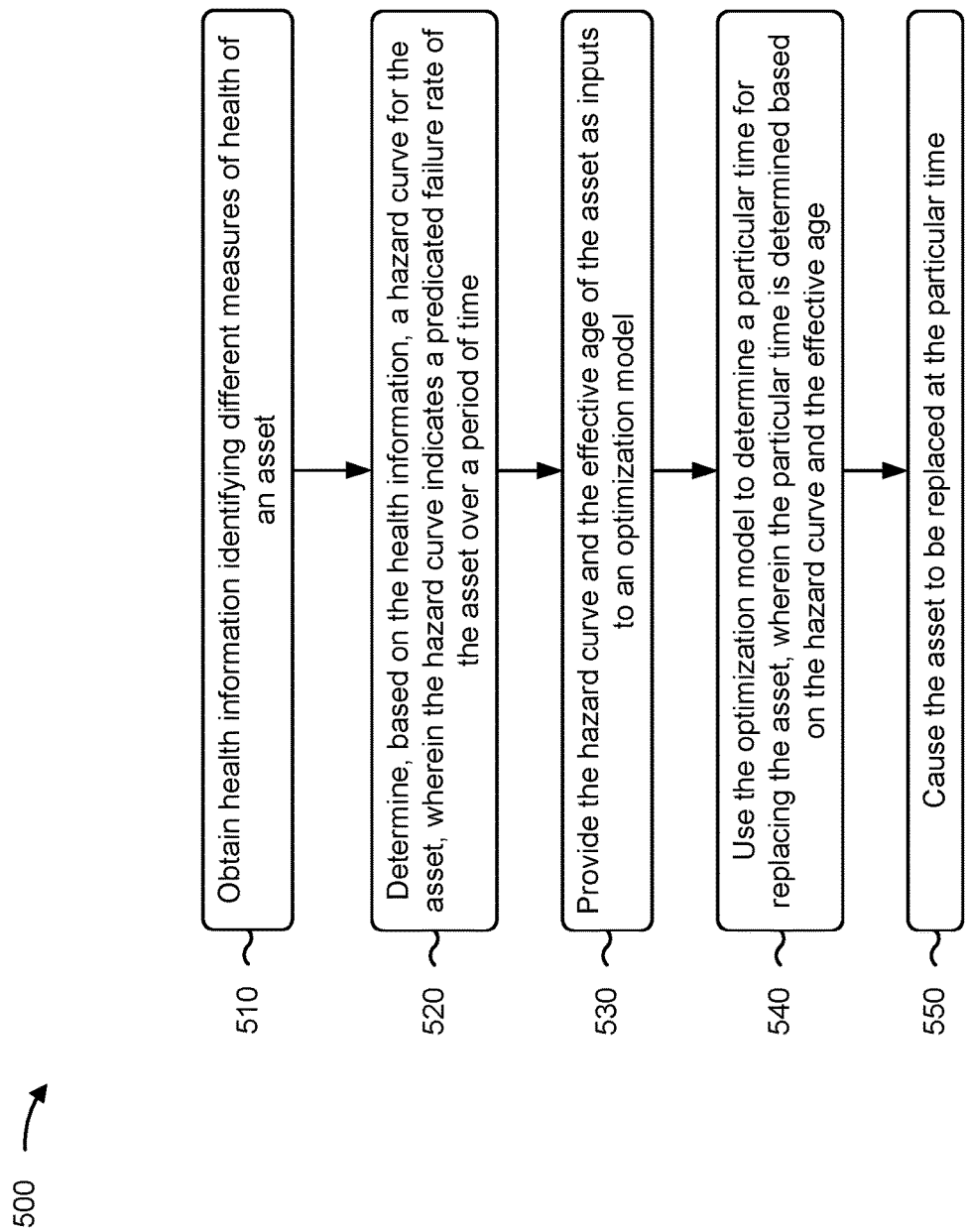
FIG. 5 is a flowchart of an example process relating to optimizing replacement of assets.

FIG. 5 is a flowchart of an example process 500 relating to optimizing replacement of assets. In some implementations, one or more process blocks of FIG. 5 may be performed by an asset replacement optimization system (e.g., asset replacement optimization system 110). In some implementations, one or more process blocks of FIG. 5 may be performed by another device or a group of devices separate from or including the asset replacement optimization system, such as an asset health configuration system (e.g., asset health configuration system 105) and/or a client device (e.g., client device 120). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include obtaining health information identifying different measures of health of an asset (block 510). For example, the asset replacement optimization system may obtain health information identifying different measures of health of an asset, as described above. The health information identifies end of life information regarding an end of life curve of the asset and an effective age of the asset. In some implementations, the health information identifies end of life information regarding an end of life curve of the asset and an effective age of the asset.

As further shown in FIG. 5, process 500 may include determining, based on the health information, a hazard curve for the asset (block 520). For example, the asset replacement optimization system may determine, based on the health information, a hazard curve for the asset, as described above. The hazard curve indicates a predicted failure rate of the asset over a period of time. In some implementations, the hazard curve indicates a predicted failure rate of the asset over a period of time.

As further shown in FIG. 5, process 500 may include providing the hazard curve and the effective age of the asset as inputs to an optimization model (block 530). For example, the asset replacement optimization system may provide the hazard curve and the effective age of the asset as inputs to an optimization model, as described above.

As further shown in FIG. 5, process 500 may include using the optimization model to determine a particular time for replacing the asset (block 540). For example, the asset replacement optimization system may use the optimization model to determine a particular time for replacing the asset, as described above. The particular time is determined based on the hazard curve and the effective age. In some implementations, the particular time is determined based on the hazard curve and the effective age.

As further shown in FIG. 5, process 500 may include causing the asset to be replaced at the particular time (block 550). For example, the asset replacement optimization system may cause the asset to be replaced at the particular time, as described above.

In some implementations, using the optimization model to determine the particular time for replacing the asset comprises using the optimization model to determine the particular time, for replacing the asset, that minimizes a cost rate associated with replacing the asset.

In some implementations, process 500 includes obtaining information identifying a failure cost of the asset, and obtaining information identifying a replacement cost of the asset, wherein the cost rate is based on the replacement cost and the failure cost of the asset.

In some implementations, process 500 includes determining a utilization duration of the asset, determining whether the particular time occurs after the utilization duration, and selectively causing the asset to be replaced based on whether the particular time occurs after the utilization duration. The asset is replaced based on the particular time occurring during the utilization duration. The asset is not replaced based on the particular time occurring after the utilization duration.

In some implementations, determining the hazard curve comprises determining the hazard curve based on the end of life information.

In some implementations, the health information further identifies predicted measures of risk of failure for a plurality of assets over a period of time. The method further comprises obtaining constraint information regarding one or more constraints associated with the plurality of assets; providing the predicted measures of risk of failure and the budget as inputs to the optimization model, and using the optimization model to determine another particular time for replacing one or more of the plurality of assets. The constraint information identifies a budget associated with the plurality of assets. The other particular time is determined based on the predicted measures of risk of failure and the budget.

In some implementations, process 500 includes determining that a quantity of assets, of the plurality of assets, exceeds a quantity threshold, determining a plurality of periods of time based on determining that the quantity of assets exceeds the quantity threshold, and using the optimization model to determine a particular period of time, out of the plurality of periods of time, for replacing the one or more of the plurality of assets.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer-implemented method comprising:
    obtaining health information identifying different measures of health of an asset,
        wherein the health information identifies end of life information regarding an end of life curve of the asset and an effective age of the asset;
    determining, based on the health information, a hazard curve for the asset,
        wherein the hazard curve indicates a predicted failure rate of the asset over a period of time;
    providing the hazard curve and the effective age of the asset as inputs to an optimization model,
        wherein the optimization model includes a machine learning model that determine schedules or replacement of assets;
    using the optimization model to determine a particular time for replacing the asset,
        wherein the particular time is determined based on the hazard curve and the effective age; and
    causing the asset to be replaced at the particular time.

2. The computer-implemented method of claim 1, wherein using the optimization model to determine the particular time for replacing the asset comprises:
    using the optimization model to determine the particular time, for replacing the asset, that minimizes a cost rate associated with replacing the asset.

3. The computer-implemented method of claim 2, further comprising:
    obtaining information identifying a failure cost associated with repairing failures of the asset; and
    obtaining information identifying a replacement cost associated with replacing the asset,
        wherein the cost rate is based on the replacement cost and the failure cost of the asset, and
        wherein the optimization model determines the particular time, for replacing the asset, that minimizes the replacement cost and the failure cost of the asset.

4. The computer-implemented method of claim 1, further comprising:
    determining a utilization duration of the asset,
        wherein the utilization duration indicates an anticipated amount of time during which the asset is used;
    determining whether the particular time occurs after the utilization duration; and
    selectively causing the asset to be replaced based on whether the particular time occurs after the utilization duration,
        wherein the asset is replaced based on the particular time occurring during the utilization duration, and
        wherein the asset is not replaced based on the particular time occurring after the utilization duration.

5. The computer-implemented method of claim 1, wherein determining the hazard curve comprises:
    determining the hazard curve based on the end of life information.

6. The computer-implemented method of claim 1, wherein the health information further identifies predicted measures of risk of failure for a plurality of assets over a period of time, and wherein the method further comprises:
obtaining constraint information regarding one or more constraints associated with the plurality of assets,
wherein the constraint information identifies a budget associated with the plurality of assets;
providing the predicted measures of risk of failure and the budget as inputs to the optimization model; and
using the optimization model to determine another particular time for replacing one or more of the plurality of assets,
wherein the another particular time is determined based on the predicted measures of risk of failure and the budget.

7. The computer-implemented method of claim 6, further comprising:
determining that a quantity of assets, of the plurality of assets, exceeds a quantity threshold;
determining a plurality of periods of time based on determining that the quantity of assets exceeds the quantity threshold; and
using the optimization model to determine a particular period of time, out of the plurality of periods of time, for replacing the one or more of the plurality of assets.

8. A computer program product comprising:
one or more computer readable storage media, and program instructions collectively stored on the one or more computer readable storage media, the program instructions comprising:
program instructions to determine, based on health information regarding an asset, a hazard function for the asset and a predicted measure of risk of failure for the asset,
wherein the health information identifies end of life information regarding a measure of durability of the asset and an effective age of the asset, and
wherein the hazard function indicates a predicted failure rate of the asset over a period of time;
program instructions to provide the hazard function and the effective age of the asset as inputs to an optimization model,
wherein the optimization model includes a machine learning model that determines schedules for replacement of assets;
program instructions to use the optimization model to determine a particular time for replacing the asset,
wherein the particular time is determined based on the hazard function and the effective age; and
program instructions to cause the asset to be replaced at the particular time.

9. The computer program product of claim 8, wherein the program instructions to use the optimization model to determine the particular time for replacing the asset include:
program instructions to optimize allocation and operational expenses while maintaining system reliability.

10. The computer program product of claim 8, wherein the program instructions further comprise:
program instructions to obtain historical failure data regarding historical failures of one or more assets and decommission data regarding the one or more assets;
program instructions to determine an end of life curve for the asset and predicted end of life scores for the asset based on the historical failure data and the decommission data,
wherein the end of life information includes the end of life curve; and program instructions to determine the hazard function based on at least one of the historical failure data or the predicted end of life scores.

11. The computer program product of claim 8, wherein the program instructions further comprise:
program instructions to obtain operational and business data regarding a replacement cost of the cost and a failure cost of the asset; and
program instructions to use the optimization model to determine the particular time for replacing the asset further based on the operational and business data.

12. The computer program product of claim 8, wherein the program instructions further comprise:
program instructions to obtain constraint information regarding one or more global constraints associated with a plurality of assets;
program instructions to provide the constraint information as an input to the optimization model; and
program instructions to obtain, as an output of the optimization model, an optimal schedule regarding replacements of the plurality of assets.

13. The computer program product of claim 8, wherein the health information further identifies predicted measures of risk of failure for a plurality of assets over a period of time, and
wherein the program instructions further comprise:
program instructions to obtain constraint information regarding one or more constraints associated with the plurality of assets,
wherein the constraint information identifies a budget associated with the plurality of assets;
program instructions to provide the predicted measures of risk of failure and the budget as inputs to the optimization model; and
program instructions to use the optimization model to determine another particular time for replacing one or more of the plurality of assets,
wherein the other particular time is determined based on the predicted measures of risk of failure and the budget.

14. The computer program product of claim 13, wherein a predicted measure of risk of failure of a particular asset, of the plurality of assets, is determined based on a measure of criticality of the particular asset and end of life information regarding an end of life curve of the particular asset.

15. A system comprising:
one or more devices configured to:
determine, based on health information regarding an asset, a hazard function for the asset and a predicted measure of risk of failure for the asset,
wherein the asset is included in a plurality of assets,
wherein the plurality of assets are geographically distributed,
wherein the health information identifies end of life information regarding a measure of durability of the asset and an effective age of the asset, and
wherein the hazard function indicates a predicted failure rate of the asset over a period of time;
provide the hazard function and the effective age of the asset as inputs to an optimization model,
wherein the optimization model includes a machine learning model that determines schedules for replacement of assets;
use the optimization model to determine a particular time for replacing the asset,
wherein the particular time is determined based on the hazard function and the effective age; and
cause the asset to be replaced at the particular time.

16. The system of claim 15, wherein the one or more devices, to use the optimization model to determine the particular time for replacing the asset, are configured to:
   use the optimization model to determine the particular time, for replacing the asset, that minimizes a cost rate associated with replacing the asset.

17. The system of claim 15, wherein the one or more devices are further configured to:
   obtain information identifying a failure cost of the asset; and
   obtain information identifying a replacement cost of the asset,
      wherein the cost rate is based on the replacement cost and the failure cost of the asset.

18. The system of claim 15, wherein the one or more devices are further configured to:
   determine a utilization duration of the asset;
   determine whether the particular time occurs after the utilization duration; and
   selectively cause the asset to be replaced based on whether the particular time occurs after the utilization duration,
      wherein the asset is replaced based on the particular time occurring during the utilization duration, and
      wherein the asset is not replaced based on the particular time occurring after the utilization duration.

19. The system of claim 15, wherein the one or more devices, to determine the hazard function, are configured to:
   determine the hazard function based on the end of life information.

20. A computer-implemented method comprising:
   obtaining health information identifying different measures of health of a plurality of assets of a system,
      wherein the plurality of assets are geographically distributed; and
   determining an appropriate time to replace at least one asset of the plurality of assets of the system,
      wherein the appropriate time is determined using an optimization model that considers predicted risk scores, end of life curves, and hazard curves,
      wherein the optimization model includes a machine learning model that determines schedules for replacement of assets, and
      wherein the predicted risk scores, the end of life curves, and the hazard curves are determined based on the health information.

21. The computer-implemented method of claim 20, further comprising:
   optimizing allocation and operational expenses while maintaining system reliability.

22. The computer-implemented method of claim 20, wherein the optimization model is adapted to include global constraints for an optimal schedule for the plurality of assets.

23. A computer-implemented method comprising:
   obtaining health information identifying different measures of health of a plurality of assets of a system,
      wherein the plurality of assets are geographically distributed; and
   determining an appropriate time to replace an asset of the plurality of assets,
      wherein the appropriate time is determined, based on the health information, and using an optimization model,
      wherein the optimization model includes a machine learning model that determines schedules for replacement of assets, and
      wherein the appropriate time optimizes capital allocation and operational expenses while maintaining or improving risk and network availability using predictive models and optimization.

24. The computer-implemented method of claim 23, further comprising:
   determining if a replacement is needed for the asset by forming an optimization model using a cumulative hazard function, a project start date, and a duration for each asset in the plurality of assets; and
   solving an optimization problem using the optimization model to obtain an optimal solution with a minimal cost rate.

25. The computer-implemented method of claim 24, further comprising:
   forming the optimization model as a mixed-integer linear program for the plurality of assets using global constraints including a total budget, upper level risks of the system, and system unavailability limits; and
   solving the mixed-integer linear program for the asset.

* * * * *